United States Patent [19]

Lassaux

[11] Patent Number: 4,467,146

[45] Date of Patent: Aug. 21, 1984

[54] ECHO CANCELLER UTILIZING PSEUDO-LOGARITHMIC ENCODING LAW

[75] Inventor: Jean Lassaux, Orvault, France

[73] Assignee: Telecommunication Radioelectriques et Telephoniques, Paris, France

[21] Appl. No.: 331,483

[22] Filed: Dec. 16, 1981

[30] Foreign Application Priority Data

Dec. 17, 1980 [FR] France ................ 80 26808

[51] Int. Cl.$^3$ ............................................. H04B 3/20
[52] U.S. Cl. ............................................. 179/170.2
[58] Field of Search ............... 179/170.2, 170.4, 170.6, 179/170.8

[56] References Cited

U.S. PATENT DOCUMENTS 4,113,997  9/1978  Horna ........................... 179/170.2

Primary Examiner—G. Z. Rubinson
Assistant Examiner—James L. Dwyer
Attorney, Agent, or Firm—Thomas A. Briody; William J. Streeter

[57] ABSTRACT

A digital echo canceller is arranged in a digital telephone circuit for PCM-signals in accordance with a pseudo-logarithmic encoding law, for example the A-law of the CCITT, in the proximity of a subscriber line interface circuit having a codec in order to cancel in the near-end speech signals S supplied by the codec to the send path the echo effect Y of the far-end speech signals X conveyed to the codec by the receive path. The echo canceller has circulating shift registers for the signals X and the coefficients C, digital correlation calculation means for obtaining the coefficients C, digital convolution calculation means for obtaining an echo cancellation signal $\bar{y}$ and digital subtraction calculation means for obtaining near-end speech signals R in which the echo effect Y has been substantially cancelled. Each of the digital correlation, convolution and subtraction calculation means incorporates only one pseudo-logarithmic-to-linear code converter, and furthermore the digital subtraction calculation means incorporates only one linear-to-pseudo-logarithmic code converter.

8 Claims, 8 Drawing Figures

| E | LIN B | | | | | | | | | | | | | A-Law B | | | | | | | | Q |
|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 0 | 1 | 2 | 3 | 4 | 5 | 6 | 7 | |
| 7 | | 1 | X | Y | Z | T | 1 | 0 | 0 | 0 | 0 | 0 | 0 | | 1 | 1 | 1 | X | Y | Z | T | 1024 – 2047 |
| 6 | | 0 | 1 | X | Y | Z | T | 1 | 0 | 0 | 0 | 0 | 0 | | 1 | 1 | 0 | X | Y | Z | T | 512 – 1023 |
| 5 | | 0 | 0 | 1 | X | Y | Z | T | 1 | 0 | 0 | 0 | 0 | | 1 | 0 | 1 | X | Y | Z | T | 256 – 511 |
| 4 | 0;1 | 0 | 0 | 0 | 1 | X | Y | Z | T | 1 | 0 | 0 | 0 | 0;1 | 1 | 0 | 0 | X | Y | Z | T | 128 – 255 |
| 3 | | 0 | 0 | 0 | 0 | 1 | X | Y | Z | T | 1 | 0 | 0 | | 0 | 1 | 1 | X | Y | Z | T | 64 – 127 |
| 2 | | 0 | 0 | 0 | 0 | 0 | 1 | X | Y | Z | T | 1 | 0 | | 0 | 1 | 0 | X | Y | Z | T | 32 – 63 |
| 1 | | 0 | 0 | 0 | 0 | 0 | 0 | 1 | X | Y | Z | T | 1 | | 0 | 0 | 1 | X | Y | Z | T | 16 – 31 |
| 0 | | 0 | 0 | 0 | 0 | 0 | 0 | 0 | X | Y | Z | T | 1 | | 0 | 0 | 0 | X | Y | Z | T | 0 – 15 |

| E(U) | MSB | | | | | | | | | | | B12 | | | LSB |
|---|---|---|---|---|---|---|---|---|---|---|---|---|---|---|---|
| 14 | A | B | C | D | E | F | 1 | 0 | 0 | 0 | 0 | 0 | 0 | 0 | 0 |
| 13 | 0 | A | B | C | D | E | F | 1 | 0 | 0 | 0 | 0 | 0 | 0 | 0 |
| 12 | 0 | 0 | A | B | C | D | E | F | 1 | 0 | 0 | 0 | 0 | 0 | 0 |
| 11 | 0 | 0 | 0 | A | B | C | D | E | F | 1 | 0 | 0 | 0 | 0 | 0 |
| 6 | 0 | 0 | 0 | 0 | 0 | 0 | 0 | 0 | A | B | C | D | E | F | 1 |
| 5 | 0 | 0 | 0 | 0 | 0 | 0 | 0 | 0 | 0 | A | B | C | D | E | F |
| 4 | 0 | 0 | 0 | 0 | 0 | 0 | 0 | 0 | 0 | 0 | A | B | C | D | E |
| 3 | 0 | 0 | 0 | 0 | 0 | 0 | 0 | 0 | 0 | 0 | 0 | A | B | C | D |
| 2 | 0 | 0 | 0 | 0 | 0 | 0 | 0 | 0 | 0 | 0 | 0 | 0 | A | B | C |

FIG.5

ECHO CANCELLER UTILIZING PSEUDO-LOGARITHMIC ENCODING LAW

BACKGROUND OF THE INVENTION

1. Field of the Invention

The invention relates to an echo canceller provided in a telephone circuit with digital paths in the proximity of a subscribers interface unit and having for its object to cancel in one digital path for conveying digital code words supplied by the interface unit and representative of samples of near-end speech signals, denoted send path hereinafter, the echo effect of digital code words representative of samples of far-end speech signals and conveyed to the interface unit via the other digital path, denoted receive path hereinafter. The interface unit controls a subscriber line or a subscriber group having a plurality of subscriber lines, and in the latter case comprises of course the necessary multiplexing and demultiplexing means.

More specifically, the echo canceller according to the invention is intended for digital PCM-transmission which utilizes a companding pseudo-logarithmic encoding law, such as the A-law of CCITT recommendation G.711 or the µ255-Law.

In the further course of the description the following symbols will be used:

X = an arbitrary pseudo-logarithmic code word which is representative of a sample of the far-end speech signal and is conveyed to the interface unit via the receive path, S = an arbitrary pseudo-logarithmic code word which is representative of a sample of the near-end speech signal and is supplied by the interface unit.

2. Description of the Prior Art

It is a generally known fact that the presence of one or more analog hybrids in the interface unit causes an impedance discontinuity which results in the return over the send path of an echo Y of the codewords X which are conveyed to the interface unit via the receive path. So the code words S supplied by the interface unit comprise in fact a near-end speech signal component Z and a far-end speech signal echo component Y. It is further known that the echo becomes annoying when the delay time of the signals attains values of some tenth of a second, irrespective of the nature of the transmission facility (electrical conductors or radio links).

Finally it is known that so far the most efficient method of substantially suppressing the echo consists in synthesizing an echo cancelling signal on the basis of the pulse response of the "echo path" (which in actual practice means the constituent parts of the interface unit which form the principal echo source), the echo cancelling signal being formed by code words Ȳ, each one of which is combined with a code word S to obtain a code word R which is practically identical to the corresponding near-end speech signal code word Z. It should be noted that here the expression "combined with" is used and not the expression "subtracted from". The latter expression would be correct if the signal samples representing code words were linear code words. When a non-linear encoding law is used for the transmission, the operation to be realized is much more complicated than a simple subtraction. The echo canceller according to the invention utilizes the above-described method.

SUMMARY OF THE INVENTION

The echo canceller in accordance with the invention, intended as mentioned above for PCM circuits of the pseudo-logarithmic code type, is of the kind comprising:

a first circulating shift register having an input, an output and a capacity of (k+1) code words, the input being connected to the receive path for receiving a pseudo-logarithmic code word X at each instant nT (where T is the sampling period of the code words and n is an integer for characterizing the number of the relevant instant) and the circulation rate of the code words in this first shift register being such that the sequence of the k most recent code words X occurs in the time interval between two consecutive instants nT and (n+1)T;

a second circulating shift register having an input, an output and a capacity of k code words, this second shift register operating in phase with the first shift register and a sequence of k coefficient code words C circulating permanently in this second shift register;

digital correlation calculation means having inputs connected to the output of the first shift register, the send path and the output of the second shift register respectively, and having an output connected to the input of the second shift register for modifying the value of the code words C circulating therein as a function of comparison criteria for the code words, supplied by the first shift register and the send path, respectively;

digital convolution calculation means having inputs connected to the output of the first shift register and the output of the second shift register, respectively, and an output supplying at each instant nT an echo cancellation code word obtained by summing k code words, each of which results from an operation for combining a code word C and a code word X supplied simultaneously by the first and second shift registers;

digital subtraction calculation means having an input connected to said interface unit, a correction input connected to the output of the convolution calculation means and an output connected to the send path, a sequence of pseudo-logarithmic code words R being supplied to the send path, each of which results from an operation for combining a code word S supplied by said interface unit and an echo cancellation code word supplied by the convolution calculation means.

The terms "correlation", "convolution" and "subtraction" are used here analogically. They would be strictly accurate only if the operations indicated thereby were used on linear code words. In that event the convolution calculation means would produce an echo cancellation word ȳ, so that $$\bar{y} = \sum_{i=0}^{k} x(n-i) \cdot c(i)$$

which relation indicates the convolution product of two polynomials having k terms, namely $$\sum_{i=0}^{k} x(n-i) \sum_{i=0}^{k} c(i)$$

where the words x and c are linear code words resulting from a pseudo-logarithmic-to-linear code conversion of the pseudo-logarithmic code words X and C.

An echo canceller of the above-mentioned type operating on pseudo-logarithmic code words is described by Donald L. Duttweiler in the article "A Twelve-Channel Digital Echo Canceller", published in "IEEE Transactions on Communications", Vol. COM-26, No. 5, May 1978, pages 647–653. In accordance with FIG. 7 of this article and the associated description the correlation and convolution means operate in actual fact on floating-point linear code words, the first shift register operates on the pseudo-logarithmic code words conveyed by the receive path, the second shift register operates on fixed-point linear code words and the subtraction means also operate on fixed-point linear codewords. From this it follows that this echo canceller does not only incorporate a pseudo-logarithmic-to-linear code converter and a linear-to-pseudo-logarithmic code converter, but also intermediate code converters for converting pseudo-logarithmic code words into floating-point linear code words, for converting floating-point linear code words into fixed-point linear code words and for converting fixed-point linear code words into floating-point linear code words.

Thus, this prior art echo canceller intended (as is also the echo canceller in accordance with the invention) for PCM transmission utilizing a pseudo-logarithmic encoding, comprises a large number of intermediate code converters which increase its complexity and its cost and contribute to an increase of the overall noise level imposed by the echo canceller.

The invention has for its object to provide an echo canceller of the above-described type which does not have these disadvantages.

According to the invention, the echo canceller is characterized in that the convolution calculation means comprise:
a calculator unit having inputs connected to the output of the first shift register and the output of the second shift register, respectively, and an output, said calculator unit supplying a sequence of pseudo-logarithmic code words U, each of which results from an operation for combining a code word X and a code word C;
a first pseudo-logarithmic-to-linear code converter having an input connected to the output of said calculator unit, and an output, this code converter converting each pseudo-logarithmic code word U into a linear code word u;
and
an accumulator-adder having an input connected to the output of said first code converter, and an output connected to the correction input of the subtraction calculation means, this accumulator-adder producing at each instant nT a linear echo cancellation code word y, which is the sum of the k most recent linear code words u.

A preferred embodiment of the echo canceller in accordance with the invention, wherein the subtraction calculation means comprise:
a second pseudo-logarithmic-to-linear code converter having an input connected to said interface unit for receiving the pseudo-logarithmic code words S, and an output, this code converter converting each pseudo-logarithmic code word S into a linear code word s;

a subtractor having a (+) input connected to the output of said second code converter, a (−) input connected to the output of said accumulator-adder, and an output, this subtractor supplying a sequence of linear code words r, each of which represents the difference between the value of a code word s and the value of an echo cancellation code word y;
a linear-to-pseudo-logarithmic code converter having an input connected to the output of said subtractor, and an output connected to the send path, this code converter converting each linear code word r into a pseudo-logarithmic code word R; is characterized in that the correlation calculation means comprise:
a third pseudo-logarithmic-to-linear code converter having an input connected to the output of the first shift register, and an output, this code converter converting each pseudo-logarithmic code word X into a linear code word x;
a comparison calculator unit having an input connected to the output of said third code converter, an input connected to the output of said subtractor, and an output, the comparison calculator unit comprising means for forming the average $|\bar{x}|$ of the absolute values $|x|$ of the k most recent code words x, for forming the ratio of the absolute value $|r|$ of each code word r to said average $|\bar{x}|$ and for producing a correction validation signal when the absolute value $|x|$ differs from said average $|\bar{x}|$ and the ratio $|r|/|\bar{x}|$ is located between predetermined limits, and
means connected to said comparison calculator unit and the second shift register for adding to the code words C circulating in the second shift register a correction term $\Delta C$ having a predetermined value and a suitable sign when said comparison calculator unit produces a correction validation signal.

From the above description it appears that, generally, the echo canceller in accordance with the invention comprises only four code converters.

Further measures in the present echo canceller, more specifically those which relate to:
the use in telephone circuits utilizing the A-law encoding,
the operation in the event of double-talk,
the initiation upon establishment of a communication, will now be further explained in the following description of an embodiment with reference to the drawings.

DESCRIPTION OF THE DRAWING

FIG. 4 is a table to complete the diagram of FIG. 3, FIG. 5 is a table relating to the representation of linear code words supplied by the pseudo-logarithmic-to-linear code converter in the convolution calculation means.

DESCRIPTION OF THE PREFERRED EMBODIMENTS

Figure 1:
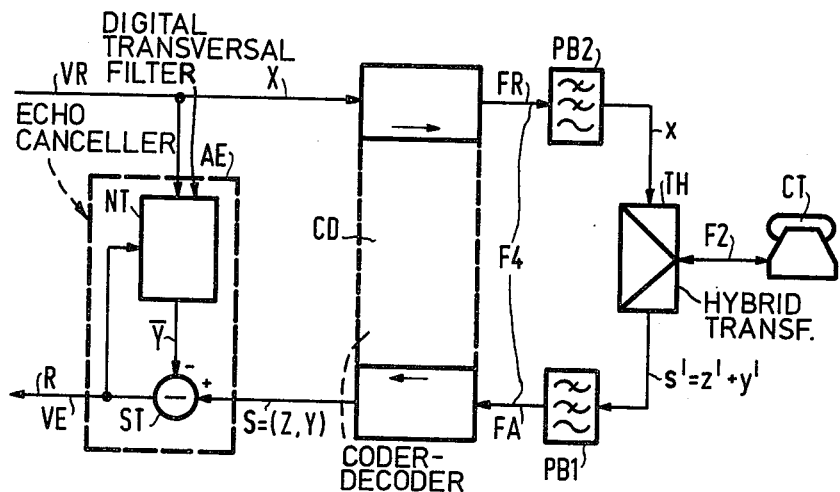
FIG. 1 is a simple circuit diagram showing the position of the echo canceller in a digital telephone circuit for only one single subscriber.

FIG. 1 will be described first. The subscriber line interface unit or circuit (SLIC) for connecting a subscriber installation, symbolised by a telephone set CT, to a digital send path VE and a digital receive path VR, usually comprises:

- a hybrid coupler or transformer TH for connecting an analog two-wire line F2 (connection to the subscriber installation CT) to an analog four-wire line F4; and
- a codec (coder-decoder combination) CD, which is of such a generally known structure that it need not be further explained here; this codec CD is connected to the output of the hybrid coupler TH via the forward-wires (FA) of the four-wire line F4 and a lowpass filter PB1 and is connected to the input of the hybrid coupler TH via the return-wires (FR) of the four-wire line F4 and a low-pass filter PB2.

The digital telephone circuit is represented by a digital send path VE, to which the codec CD supplies a digital signal S which is the result of the pseudo-logarithmic encoding of the analog signal supplied by the wires FA, and by the digital receive path VR, which conveys the digital pseudo-logarithmic code signal X which is converted by the codec CD into an analog signal x supplied to the wires FR.

Via the digital send path VE the interface unit transmits the signal S, which results from the combination of a near-end speech signal Z originating from the subscriber installation CT and an echo signal Y. Properly speaking, this combination is not addition, because the signal S is the result of the conversion into pseudo-logarithmic code words of the analog signal s' supplied by the hybrid coupler TH. In actual fact, it is this signal s' which is the sum of an analog speech signal z' and an analog echo signal y'.

The echo canceller AE in accordance with the invention functions in a similar way as the other above-described prior art echo cancellers. It has for its part to generate, starting from the digital signals X and S, a digital signal R which is applied to the send path VE and is as faithful a conversion as possible of the analog speech signal z' not affected by the analog echo signal y'. So the echo canceller may be considered as being constituted by a digital transversal filter NT which, starting from the digital signals R and X, generates an echo cancellation signal $\bar{Y}$, and a digital subtractor ST which "subtracts" this signal $\bar{Y}$ from the signal S. It is here repeated that actually the subtractor ST does not subtract, properly speaking, the signal $\bar{Y}$ from the signal S because of the adopted encoding mode.

Figure 2:
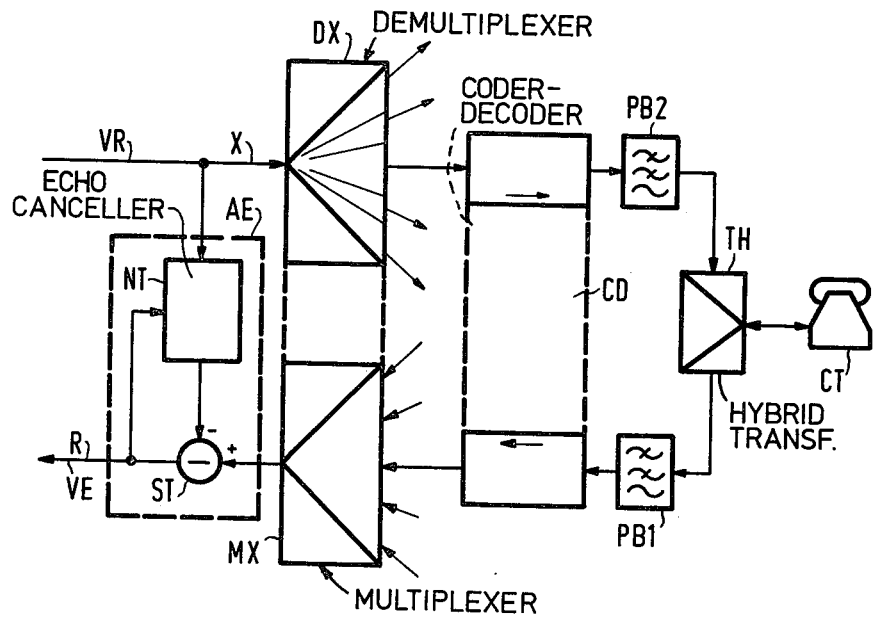
FIG. 2 is a simple circuit diagram showing the position of the echo canceller in a digital telephone circuit for a group having a plurality of subscribers.

So far the case has been considered in which one single subscriber installation CT is connected to the digital telephone circuit. FIG. 2 relates to the case in which a plurality of subscriber installations such as CT are connected; all the elements of FIG. 1 are also shown in FIG. 2. The difference is that in FIG. 2 the digital send path VE is connected to the codec CD by means of a multiplexer MX, which also provides the connection to the codecs of other subscriber installations (not shown), while the connection to the digital receive path VR is provided by a demultiplexer DX, whose outputs are connected to the codec CD and to the codecs of the other subscriber installations (not shown). Then, one side of the echo canceller AE is connected to the receive path VR and the input of the demultiplexer DX and the other side between the output of the multiplexer MX and the send path VE.

It will appear that, whether the echo canceller has for its object to process single digital signals (as shown in FIG. 1) or multiplex digital signals (as shown in FIG. 2), the general circuit diagram of the echo canceller in accordance with the invention remains unchanged. The differences only reside in the functional characteristics of the components, their operation speed in particular.

When by way of example digital telephone circuits with European standards are used:

- the rate of the digital signal to be processed is 64 kilobaud (8 kilobytes) in the first case, and
- in the second case, the maximum rate will be 2.048 megabaud (32 channels of 8 kilobytes each).

Figure 3:
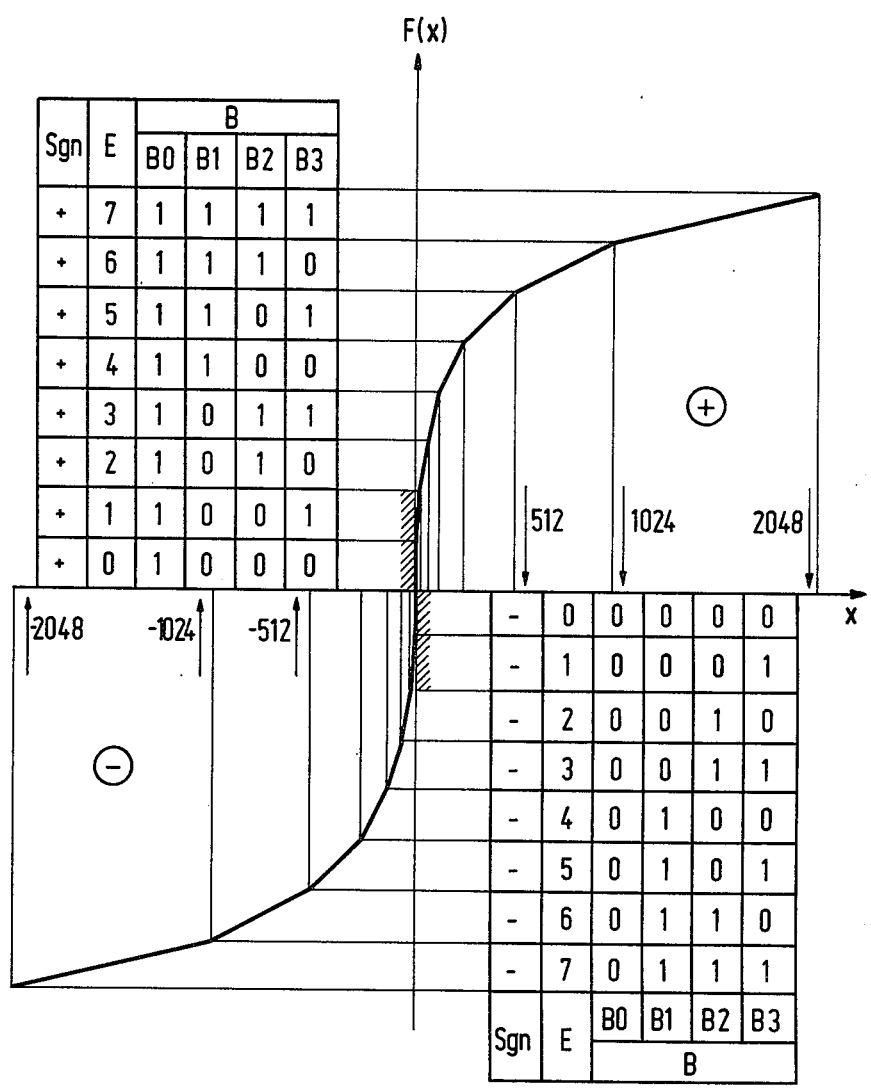
FIG. 3 is a diagram showing the known characteristics of the A-law for pseudo-logarithmic encoding.

FIG. 3 will now be described which, as a reminder, shows the encoding diagram of the amplitudes in accordance with the A-Law of the CCITT recommendations. The embodiment of the echo canceller to be described hereinafter relates to processing pseudo-logarithmic code words in accordance with this A-Law. However, it should be borne in mind that the invention is also suitable for use when the encoding law is different, of course on the condition that a pseudo-logarithmic encoding is involved.

In FIG. 3, the analog amplitude to be encoded is plotted on the horizontal axis and the encoding (companding) result is plotted on the vertical axis. The resulting encoding curve, above and below the horizontal axis, is the result of the combination of two curve portions. If $|x|$ is the absolute value of the amplitude x to be encoded, Sgn(x) the sign and A a constant (A=87.6) these curve portions are given by:

for $1/A \leq |x| \leq 1$, the linear approximation (by means of six segments) of the logarithmic function $$F(x) = \text{Sgn}(x) \cdot [1 + \log(A|x|)]/(1 + \log A)$$

for $0 \leq |x| \leq 1/A$, the linear function $$F(x) = \text{Sgn}(x) \cdot A|x|/(1 + \log A).$$

It appears that the diagram is symmetrical with respect to the origin and that the junctions of the two curve portions have as their coordinates, in absolute value:

$$|x| = 1/A |F(x)| = 1$$

The linear curve portion is shown as a hatched portion along the vertical axis.

Furthermore, the diagram includes two Tables in which each row corresponds to a segment of the curve F(x). In this row, there are shown the sign Sgn and the number E of the segment, and furthermore the encoding of the sign Sgn (the most significant bit Bo) and the encoding of the number E (bits B1, B2, B3). As the psuedo-logarithmic code words comprise 8 bits (i byte) these Tables are not complete. The four remaining bits (B4, B5, B6, B7) are used to encode the position within a given segment.

The Table of FIG. 4 gives a more detailed specification of the encoding as regards the position within a segment. The binary representation of this position is denoted "mantissa" by analogy with an actual logarithmic encoding. The right-hand portion of the Table relates to the binary representation in accordance with the A-Law and the left-hand portion to the binary representation in accordance with a linear code which would be required in the absence of pseudo-logarithmic compression (companding). In the Table, the first column shows the segment number E, the second column shows the 13 bits of the linear representation with one sign bit (bit B0) and 12 magnitude bits (bits B1–B12), the third column the A-law representation with one sign bit (bit B0), three segment bits for the encoding of segment number E (bits B1, B2, B3) and four mantissa bits for the encoding of the position within a given segment (bits B4, B5, B6, B7), while the fourth column shows the corresponding quantization range Q of the input signal. The bits having the values X, Y, Z, T in the left-hand portion form the mantissa bits of the right-hand portion. From this Table it appears that the pseudo-logarithmic code with only eight bits may represent a range of levels for which a linear code representation would require 13 bits.

Figure 6:
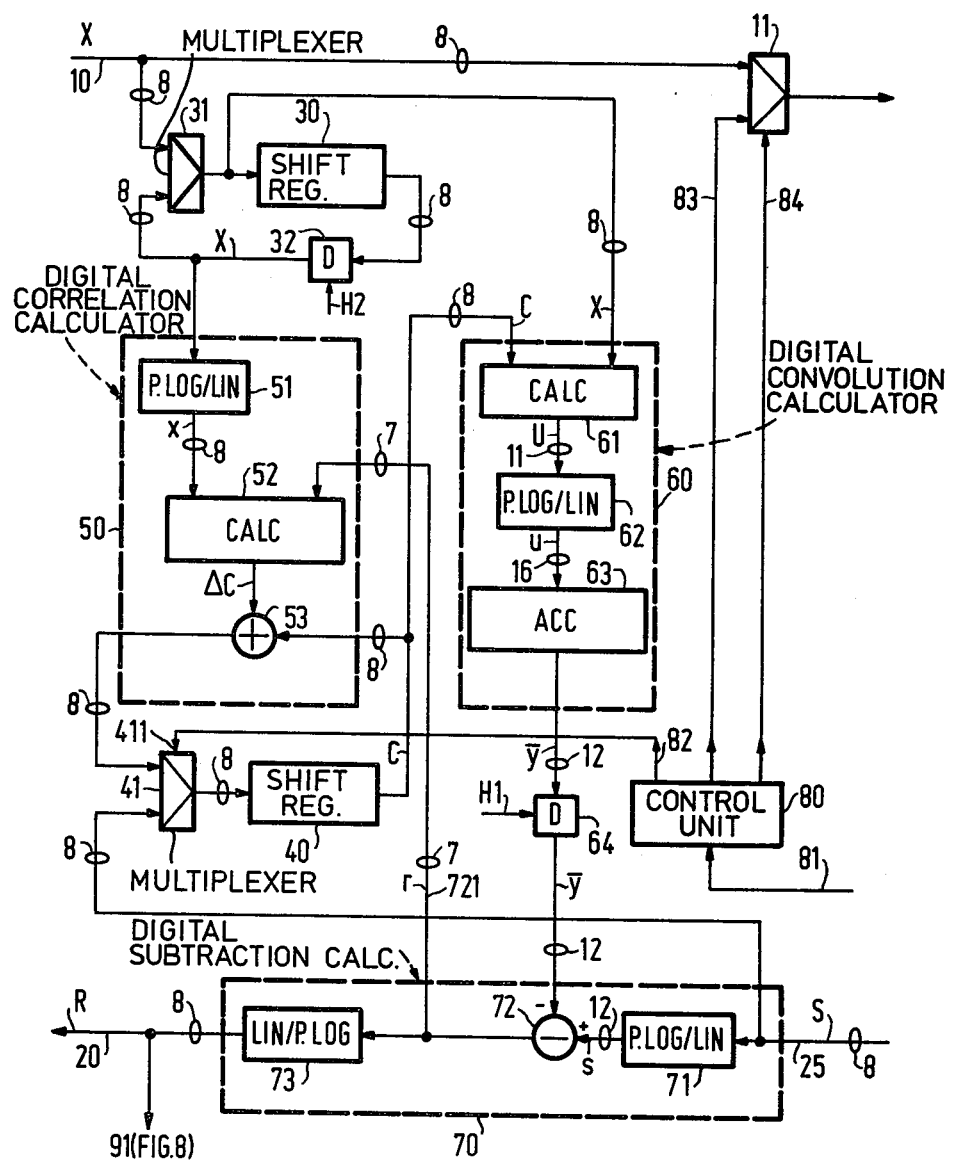
FIG. 6 shows a general block diagram of an embodiment of an echo canceller in accordance with the invention.

There now follows a description of FIG. 6 which shows the general block diagram of an embodiment of the echo canceller in accordance with the invention. For simplicity, neither in the circuit diagram of FIG. 6, nor in the diagrams of the following figures, will further indication be given whether the internal connections are "parallel" connections or "series" connections. Irrespective of the type of connection it will be surrounded by a small circle having a figure indicating the number of bits of the code words which are conveyed via this connection, if this number of bits is greater than one.

In FIG. 6, the digital calculation means, registers and connections which were mentioned already in the general description of the echo canceller of the invention will be recognized, namely:
- a connection 10 of the receive path (VR) conveying the pseudo-logarithmic code words X of the far-end speech signal,
- a connection 20 of the send path (VE) conveying the pseudo-logarithmic code words R of the near-end speech signal,
- an output connection 25 of the interface unit (output of the codec or output of the multiplexer) supplying the digital codewords S of the near-end speech signal affected by the echo to be cancelled,
- a first shift register 30 (in which the code words X circulate) and a second shift register 40 (in which the coefficient words C circulate);
- digital correlation calculation means 50,
- digital convolution calculation means 60,
- digital subtraction calculation means 70, and
- a control unit 80 whose task will be described in detail hereinafter.

Before continuing the description of the circuit diagram of FIG. 6, the nature of the operations effected in the echo canceller in accordance with the invention will be described in greater detail.

Because of the impulse response of the echo path the following relation would hold at each instant nT (where T is the sampling period of the signals to be transmitted and n the number of occurrence of this instant), if the transmission would utilize a linear encoding law:

$$s(n)=z(n)+x(n)*c(n)=z(n)+y(n)$$

in which relation s(n) is the speech signal supplied by the interface unit to the connection and affected by an echo effect, z(n) is the pure near-end speech signal, x(n) is the far-end speech signal, c(n) the impulse response of the echo path,* the symbol representing a convolution operation and y(n) the echo. In known manner, the function of the echo canceller would then be:

(a) the generation of an echo cancellation signal $\bar{y}(n)$ where $$\bar{y}(n)=x(n-k)\cdot c(k)+x(n-k-1)\cdot c(k-1)+ \ldots +x(n-1)\cdot c(1)$$

(b) the calculation of r(n) so that it holds that:

$$r(n)=s(n)-\bar{y}(n).$$

In these relations, k is a number of terms sufficient to simulate the echo y(n) with a sufficient degree of accuracy, $x(n-k)$ is the far-end speech signal at the instant $(n-k)T$ and c(k) the weight assigned to this signal in the polynomial for calculating $\bar{y}(n)$.

In a more compact manner this might alternatively be written as:

$$\bar{y}(n) = \sum_{j=1}^{k} x(n-j) \cdot c(j)$$

Since the encoding used is not linear, it will be an inducement to calculate in the echo canceller in accordance with the invention the correspondences:

$$S \rightarrow s, \ Z \rightarrow z, \ X \rightarrow x$$

where the capitals represent a pseudo-logarithmic code word (from which its index has been removed) and the lower case letters represents a linear code word.

The invention renders it possible to calculate these correspondences with a maximum of simplicity and a minimum of means. It will appear that in particular use will be made of the observation that it is useless to compute the correspondence $C \rightarrow c$, where C is a weight factor expressed by a pseudo-logarithmic code word and c the corresponding linear code word.

Reverting to the description of the circuit diagram shown in FIG. 6 it should once again be noted that:
- the transmission words are encoded in accordance with the A-law,
- the sampling rate is 8 kHz, that is to say the interface unit serves one single subscriber installation.

Figure 7:
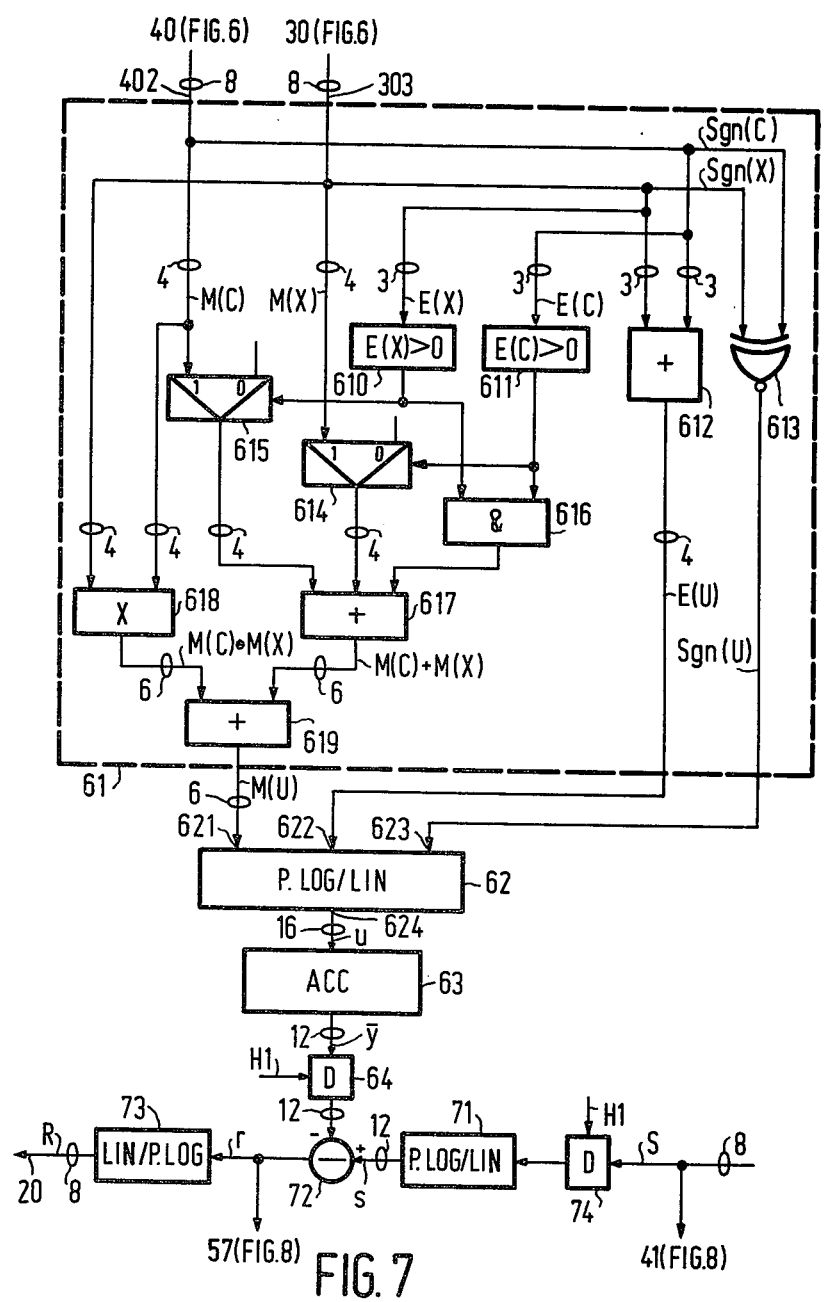
FIG. 7 shows a block diagram of the convolution and subtraction calculation means of the embodiment shown in FIG. 6.
Figure 8:
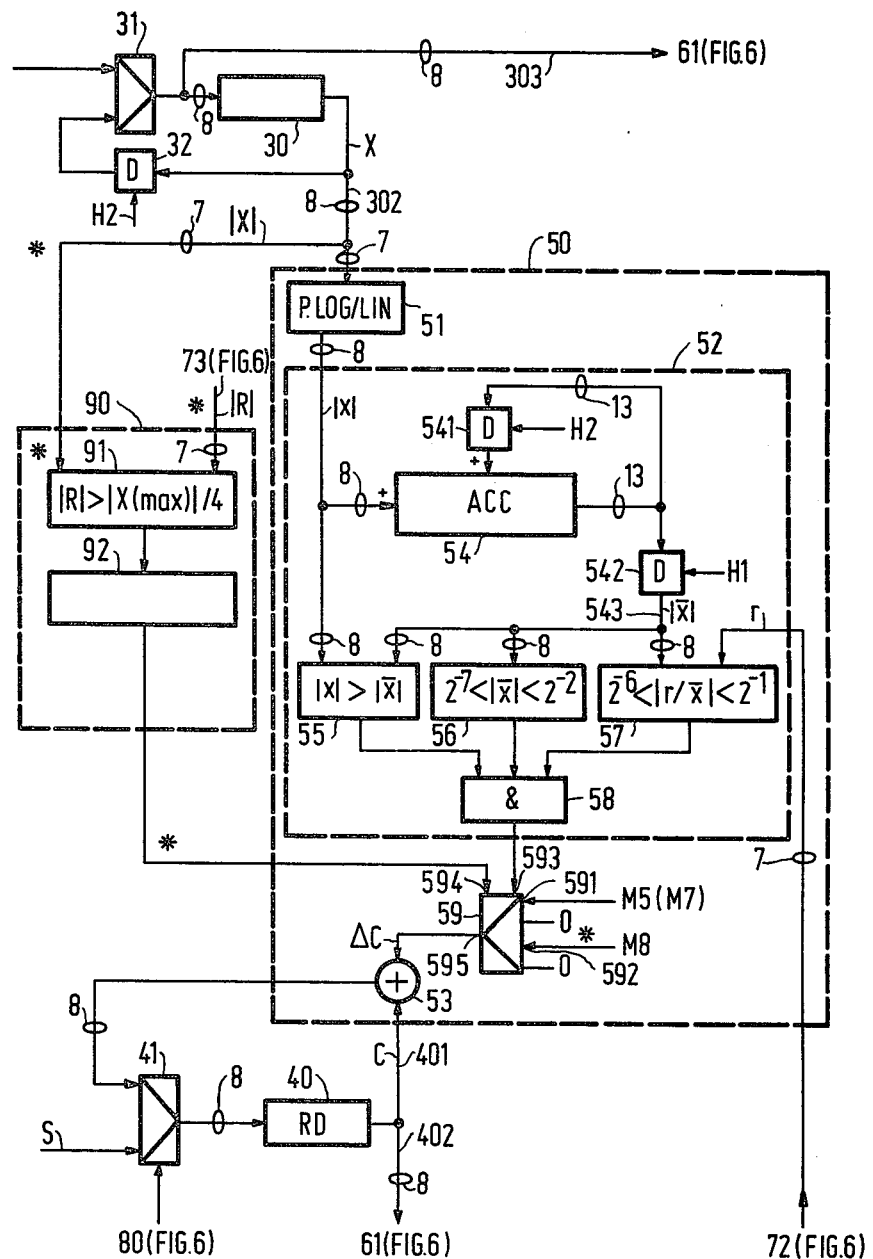
FIG. 8 shows a block diagram of the correlation calculation means of the embodiment shown in FIG. 6.

In FIG. 6, as also in the FIGS. 7 and 8, D-type flip-flops are present which actually symbolize groups of flip-flops, if the connections in which they have been included are parallel connections. The values of the synchronizing frequencies (or clocks) are symbolized by H1 or H2. The frequency H1, which controls the synchronization of the code words processed by the calculation means, is 8 kHz. The frequency H2 controls the circulation speed of the code words for calculating sums or averages of samples. As computations and simulation tests have proved that 32 samples are sufficient (k=32) to obtain a reconstruction of the echo signal, the value of this frequency is:

$$H2=H1\cdot k=256 \text{ kHz.}$$

Exceptions apart, the convergence conditions of the terms of the polynomial for calculating the echo compensation signal will not be discussed, as it is within the grasp of the average person skilled in the art to determine them.

So, the capacity of the shift register 30 is (k+1)=33 code words of 8 bits. The input of this register 30 is connected to the output of a multiplexer 31. The inputs of this multiplexer are connected to the connection 10 and also to the output of the shift register 30. This last-mentioned connection is realized by means of a flip-flop 32 which is synchronized with the frequency H2. In each sampling period (that is to say every 125 microseconds) the multiplexer 31 introduces into the shift register 30 the new code word X conveyed via the connection 10. This new code word then occupies its position within the sequence circulating in the shift register 30 at a rate of 256 kilobytes per second and replace the oldest code word therein.

Each output code word X of the shift register 30 is conveyed via an 8-bit connection to the input of the correlation calculation means 50 and also to the input of the convolution calculation means 60.

The correlation calculation means 50 will be described in greater detail with reference to FIG. 8. It should, however, be noted here already that they comprise:

- a pseudo-logarithmic-to-linear code converter 51 whose input is connected to the output of flip-flop 32 and whose output supplies the linear code words x, each of which results from the conversion of a pseudo-logarithmic code word X;
- a comparison calculator unit 52 having a first input connected to the output of the code converter 51 and a second input connected to the output of a subtractor 72 in the subtraction calculation means 70 (see further on in the description); this comparison calculator unit 52 receives via this second input the most significant bits of the linear code words r supplied by the subtractor 72 and calculates, according to criteria which will be defined hereinafter, correction terms ΔC which are positive, negative or equal to zero; and
- an adder 53 whose inputs are connected to the output of the second shift register 40 and to the output of the comparison calculator unit 52, and whose output is connected to the input of this shift register 40 via a multiplexer 41.

The shift register 40 has a capacity of k=32 code words. So a sequence of 32 code words C, each of which, if necessary, can be corrected during its passage through the adder 53, circulates permanently in this shift register. The multiplexer 41 is used for the initiation during the establishment of a communication. Its operation will be further described hereinafter.

It should also be noted that the convolution calculation means 60 comprise:

- a calculator unit 61 having two inputs connected to the output of the multiplexer 31 (code words X) and to the output of the shift register 40 (code words C), respectively, the calculator unit 61 supplying a sequence of pseudo-logarithmic code words U, each of which results from a combinations of the code word X and the code word C which are received simultaneously,
- a pseudo-logarithmic-to-linear code converter 62 whose input is connected to the output of the calculator unit 61 and those output supplies the linear code words u, each of which results from the conversion of a code word U; and
- an accumulator-adder 63, whose input is connected to the output of the code converter 62 and whose output produces linear code words ȳ, each of which results from the summation of the k most recent code words u produced by this code converter 62.

The subtraction calculation means 70 comprise:

- a pseudo-logarithmic-to-linear code converter 71, whose input is connected to the output of the interface unit (connection 25) and which converts each pseudo-logarithmic code word S supplied by the said output into a linear code word s;
- a subtractor 72, whose (+) input is connected to the ouput of the code converter 71 and whose (−) input is connected to the output of the accumulator-adder 63 via a flip-flop 64 which is synchronized with the frequency H1; and
- a linear-to-pseudo-logarithmic code converter 73 connected to the output of the subtractor 72 and converting the linear code words r supplied by this subtractor into pseudo-logarithmic code words R which are supplied to the send path 20.

The control unit 80 has inter alia:

- an input connected to the subscriber set (not shown) by means of a line 81,
- an output connected by means of a line 82 to a control input 411 of the multiplexer 41, which in addition to a signal input connected to the output of the adder 53 has an other signal input connected to the connection 25 (code words S),
- an output connected to a signal input of a multiplexer 11 by means of a line 83, and
- an output connected by means of line 84 to the control input of this multiplexer 11.

Before giving a more detailed description of the correlation calculation means 50, the convolution calculation means 60 and the subtraction calculation means 70 with reference to the FIGS. 7 and 8, it is useful to give some additional indications of the functions of these means.

Normally, the multiplexer 41 connects the output of the adder 53 to the shift register 40. Normally, the multiplexer 11 connects the receive path 10 to the interface unit. When the control unit 80 is informed via the line 81 of the establishment of a communication involving the interface unit (binary signal originating from the subscriber loop detection) this unit 80 applies instantaneously and simultaneously:

- via the line 82 to the control input 411 of the multiplexer 41 the command to connect the connection 25 (output of the interface unit) to the input of the shift register 40,
- via the line 84 to the control input of the multiplexer 11 the command to connect the line 83 to the input of the interface unit,
- finally, via the line 83 a pulse of unit value.

At this precise moment, the first code words S supplied to the multiplexer 41 and consequently to the shift register 40 represent the samples of the impulse response of the echo path and these code words S constitute the first coefficient code words C, which circulate in the shift register 40 and are combined pair-wise by the convolution calculation means 60 with the first code words X supplied by the shift register 30 for generating the first echo cancellation code words ȳ.

The coefficient code words C are pseudo-logarithmic code words which, as also the sample words X, comprise a sign bit, three segment bits and four mantissa bits.

When the multiplexer 11 has established the connection of the line 10 to the input of the interface unit and the multiplexer 41 has established the connection of the output of the adder 53 to the input of the shift register 40, the computer 61 realizes for each pair of code words C and X the operation:

$$U = C*X$$

which will be defined accurately hereinafter.

Each word U produced by the calculator unit 61 is a pseudo-logarithmic code word which is converted by the code converter 62 into a linear code word u. The accumulator-adder 63 produces at each instant nT a linear code word ȳ which is the sum of the k most recent words u.

In the subtraction calculation means 70 the following operations are carried out:
- the code converter 71 converts each pseudo-logarithmic code word S supplied by the connection 25 into a linear code word s,
- the subtractor 72 subtracts from the code word s the code word ȳ supplied at the same instant,
- each linear code word r=s−ȳ produced by the subtractor 72 is converted by the code converter 73 into a pseudo-logarithmic code word R which is supplied to the send path 20.

Each code word r is also supplied to the comparison calculator unit 52 via the connection 721. This unit 52, which will be further described hereinafter, also receives the code words x and realizes the comparisons, on the basis of which, depending on the results, a correction code word ΔC can be added to or subtracted from the code words C circulating in the shift register 40 by means of the adder 53, or the value of the said code words C is not changed. After each correction, the new coefficient C thus obtained replaced at the input of the multiplexer 41 the old code word C supplied by the shift register 40. The code words C and ΔC are pseudo-logarithmic code words.

Before a description will be given of FIG. 7 which relates to the structure of the convolution calculation means 60 and the subtraction calculation means 70, some indications will now be given about the calculations carried out by the calculator unit 61 which for generating a code word U combines two-by-two a code word C and a code word X appearing at its inputs.

The following notations will be used hereinafter:
A(X), A(C) and A(U) for the amplitude represented by the code words X, C and U;
E(X), E(C) and E(U) for the corresponding segment numbers;
M(X), M(C) and M(U) for the corresponding mantissa values.

If, as is customary, the value 1 is assigned to the bits having number 8 in the linear representation of the amplitudes (FIG. 4) the following relations hold:
if E(C)≠0: A(C)=2 exp [E(C)]·[1+M(C)]
if E(C)=0: A(C)=2·M(C)
if E(X)≠0: A(X)=2 exp [E(X)]·[1+M(X)]
if E(X)=0: A(X)=2·M(X)
where 2 exp [E(C)] indicates that 2 must be raised to the power E(C).

In order to accomplish that each code word U produced by the calculator unit 61 is such that A(U)=A(C)·A(X), this calculator unit must distinguish four cases, as calculation demonstrates that it holds that:

| | | |
|---|---|---|
| (a) | if E(C)=E(X)=0:<br>{ M(U)=M(C)·M(X)<br>  E(U)=2 | 0<M(U)<1 |
| (b) | if E(C)=0 and E(X)≠0:<br>{ M(U)=M(C)·[1+M(X)]<br>  E(U)=E(X)+1 | 0<M(U)<2 |
| (c) | if E(C)≠0 and E(X)=0:<br>{ M(U)=[1+M(C)]·M(X)<br>  E(U)=E(C)+1 | 0<M(U)<2 |
| (d) | if E(C)≠0 and E(X)≠0:<br>{ M(U)=[1+M(C)+M(X)+M(C)·M(X)]<br>  E(U)=E(C)+E(X) | 0<M(U)<4 |

If 4 bits are reserved for the fractional portion (of the code words C and X), the representation of M(U) requires in principle: 4 bits for case (a), (5 bits for the bases (b) and (c) and 6 bits for case (d).

FIG. 7 will now be described in greater detail. The calculator unit 61 of the convolution calculation means 60 (FIG. 6) comprises two threshold detectors 610 and 611, an adder 612, a NEXOR-gate (Exclusive-OR with inverting output) 613, two multiplexers 614 and 615, an AND-gate 6161, a multiplier 618 and two further adders 617 and 619. The connections of these several elements and their functions are organized as follows:

threshold detector 610: a 3-bit input for receiving the segment bits E(X) conveyed by the 8-bit connection 303 (output of shift register 30 of FIG. 6) and a 1-bit output which supplies a validation signal if E(X) exceeds 0;

threshold detector 611: a 3-bit input for receiving the segment bits E(C) conveyed by the 8-bit connection 402 (output of shift register 40 of FIG. 6) and a 1-bit output which supplies a validation signal if E(C) exceeds 0;

adder 612: two 3-bit inputs whose respective connections are the same as the inputs of threshold detectors 610 and 611, and a 4-bit output which supplies the segment number E(U)=E(C)+E(X);

gate 613: two 1-bit inputs for receiving the sign bits Sgn(X) and Sgn(C), respectively, which are conveyed by the connections 303 and 304, and an 1-bit output supplying the value 1 if Sgn(X)=Sgn(C), that is to say if Sgn(U)=B 1, and the value 0 if Sgn(X)≠Sgn(C);

multiplexer 614: a 4-bit signal input connected to the connection 303 to receive therefrom the mantissa bits M(X), a validation input connected to the output of the detector 611, and a 4-bit output which only passes the value M(X) if the detector 611 supplies its validation signal and passes the value 0 in the opposite case;

multiplexer 615: a 4-bit signal input connected to the connection 402 to receive therefrom the mantissa bits M(C), a validation input connected to the output of the detector 610, and a 4-bit output which only passes the value M(C) if the detector 610 supplies its validation signal and passes the value 0 in the opposite case;

AND-gate 616: two 1-bit inputs connected to the outputs of the detectors 610 and 611, respectively, and a 1-bit output which supplies the logic value 1 if the two detectors supply their validation signal simultaneously;

adder 617: three inputs connected to the outputs of the multiplexer 614, of the multiplexer 615 and of the gate 616, respectively, and a 6-bit output supplying the sum of the respective values produced by these three elements;

multiplier 618: two 4-bit inputs connected to the connections 303 and 402, respectively, in order to receive the mantissa bits M(X) and M(C), and a 6-bit output supplying the value of the product M(C)·M(X); and finally adder 619: two 6-bit inputs connected to the output of the multiplexer 618 (value of M(C)·M(X)) and to the output of the adder 617 (if necessary: value of M(C)+M (X)), respectively, and a 6-bit output which supplies the value M(U).

The multiplier 618 may be constituted on the basis of a table of corresponding values stored in a read-only-memory and read on recept of a read command (the mantissa bits M(X) and M(C)).

With the above description of the calculator unit 61 it can be verified that it really carries out the calculations of the above-mentioned cases (a), (b), (c) and (d).

In addition to the calculator unit 61 convolution calculation means 60 comprise the pseudo-logarithmic-to-linear code converter 61 and the accumulator-adder 63.

The code converter 62 has the following inputs:
- a 6-bit input 621 connected to the output of the adder 619 (mantissa value M(U));
- a 4-bit input 622 connected to the output of the adder 612 (segment number E(U));
- input 623 connected to the output of the gate 613 (value of the sign Sgn(U)).

At its 16-bit output 624 the code converter 62 restitutes the value of the product u=x·c, x being the linear code word resulting from the conversion of each code word X supplied by the shift register 30 in FIG. 6 and c being the linear code word resulting from the conversion of each code word C supplied by the shift register 40 in FIG. 6.

This code converter 61 may be formed by means of a table of corresponding values stored in a read-only-memory (or a programmable logic array of the FPLA-type).

The table of FIG. 5 illustrates a portion of the code of the words u. It relates to a linear code of 16 bits in twos complement notation. The bits A, B, C, A, E, F are mantissa bits received from the adder 619. The sign bit is not included. The first column indicates the segment number E(U) encoded by means of 4 bits, which preceed the bit A and are all fixed at the value 0 in the table. In order to obtain signed numbers it is sufficient to take the twos complement of the binary numbers included in the table when the sign bit (not shown) indicates a negative number.

The accumulator-adder 63, whose 16-bit input is connected to the output of the code converter 62, supplies to the (−) input of the subtractor 72, by means of the flip-flop 63 synchronized at the rate H1 (sampling rate), a sequence of codewords $\bar{y}$ in which each code word results from the summation of the k most recent words u supplied by the code converter 62. In other words, it holds for each instant nT that:

$$\bar{y}(n) = \sum_{i=0}^{31} x(n-i)\cdot c(i)$$

As these code words $\bar{y}$ are linear code words, they can be subtracted in the subtractor 72 from the linear code words s which result from the conversion by the code converter 71 of the pseudo-logarithmic code words S conveyed over the flip-flop 74 also synchronized at the rate H1. As mentioned in the foregoing, this results in a sequence of linear code words r, which are converted by the code converter 73 into pseudo-logarithmic code words R supplied to the send path 20.

The code words $\bar{y}$ supplied by the accumulator-adder 63 are rounded to 12 bits (see bit B 12 in the table of FIG. 5). The code words s produced by the code converter 71 have also 12 bits, as have also the code words r which are produced by the subtractor 72. The code converter 73 which supplies the code words R, re-establishes a PCM-encoding according to the A-law with 8 bits.

FIG. 8 relates to the correlation calculation means 50 (FIG. 6) and more specifically the comparison calculator unit 52 which optionally produces correction terms ΔC with a suitable sign, which the adder 53 adds to or subtracts from the coefficient code words C circulating in the shift register 40 via the multiplexer 41.

FIG. 8 also shows a double-talk detector 90 which will be described in greater detail hereinafter. It will be demonstrated that this detector 90 may be omitted. For this reason the detector 90 is marked with an asterisk, as are also the connections which are superfluous in the absence of the detector.

First of all it should be noted that the input of the code converter 51, which receives the pseudo-logarithmic code words X from the shift register 30, does not receive the sign bit. For this reason it is a 7-bit input. The linear code words |x| produced by this code converter 51 are words having an absolute value rounded to 8 bits.

The circuits constituting the comparison calculator unit 52 (FIG. 6) are an accumulator-adder 54, three level detection comparators 55, 56 and 57, an AND-gate 51 and a multiplexer 59. Their connections are organized as follows:

accumulator-adder 54: a 8-bit input connected to the output of the code converter 51, a 13-bit input coupled to a 13-bit output via a flip-flop 541 of the D-type, which is synchronized at the rate H2 of the code words |x|; this output is also connected to a 8-bit connection 543 via a flip-flop 542 of the D-type, which is synchronized at the rate H2;

level detection comparator 56 having an 8-bit input connected to the connection 543, level detection comparator 55 having an 8-bit input connected to the output of the code converter 51 and an 8-bit input connected to the connection 543;

level detection comparator 57 having an 8-bit input connected to the output of the subtractor 72 (FIG. 6) and an 8-bit input connected to the connection 543;

AND-gate 58 having three inputs connected to the three outputs of the level detection comparators 55, 56 and 57, respectively;

multiplexer 59 having two validation or control inputs connected to the output of the AND-gate 58 and to the output of the double-talk detector 90, respectively, and having an output connected to one of the inputs of the adder 53.

It should be borne in mind that the code words C are pseudo-logarithmic code words. Although they comprise only 8 bits when they are applied to the calculator unit 61 (FIG. 6) the capacity of the shift register 40 is 32 words (k=32) of 12 bits, so that the correction can be effected with a sufficient degree of accuracy. In the order of decreasing significance, these 12 bits comprise a sign bit Sgn, three segment bits E1, E2 and E3 and eight mantissa bits M1 to M8. From preliminary studies it has been found that the above-mentioned calculation algorithm converges in a satisfactory manner if the corrections only relate to bit M5 of the mantissa (which bit is not retained during the formation of the partial products X·C), the multiplexer 59 has for its sole object to produce (if necessary) a bit of a suitable value, whose algebraic addition to the said bit M5 is provided for by the adder 53. This correction bit is equal to (+1) or (−1), according as the sign of the product C·X·R is positive or negative. For that purpose, the input 591 of the multiplexer 59 is connected via lines (not shown) to the connection 402 (output of the shift register 40), to the connection 303 (input of the shift register 30) and to the send path 20, for permanently receiving corresponding sign bits. So the output 595 of the multiplexer 59 is a three state output namely:

state zero if the AND-gate 58 does not supply a control signal to the control input 593, state (+1) or (−1) if the AND-gate 58 does supply a control signal.

This control signal is only supplied if the following conditions are simultaneously satisfied:

(a) the level of the far-end speech signal sample (code word X) must be different from the average level of the k preceding samples, if not, the correction is useless;

(b) this level must be sufficient in order that the correction enables a proper adaptation;

(c) this level must not exceed the nominal capacity of the PCM-transmission; if it does not exceed the nominal capacity, the sample is limited and the non-linearities then resulting are not reproduced by the echo canceller;

(d) the level of the restituted near-end speech signal sample (code word R) must not be too high; if it is too high it would be indicative of accidental near-end noise (which in particular intervenes immediately after the beginning of the initiation), taking account of which would have a negative effect on the quality of the adjustment of the coefficients C;

(e) the far-end speech signal samples (code words X) must mutually be decorrelated sufficiently, if not, there is the risk that the calculation algorithm of the compensation signal starts diverging.

The level detection comparator 55 compels respect of condition (a) and does supply a validation signal to the AND-gate 58 only if the absolute value $|x|$ of the linear code word x supplied by the code converter 51 is greater than the average absolute value $|\bar{x}|$ supplied by the accumulator 54.

The level detection comparator 56 compels respect of the conditions (b) and (c) and does supply a validation signal to the AND-gate 58 only if the average absolute value $|\bar{x}|$ is greater than 2 exp (−7) and less than 2 exp (−2).

Finally, the level detection comparator 57 compels respect of the conditions (d) and (e) and does supply a validation signal to the AND-gate 58 only if the absolute value of the ratio $|r/|\bar{x}||$ of the value of the linear code words r restituted by the subtractor 72 (FIG. 6) to the average value $|\bar{x}|$ is less than 2 exp (−1) and greater than 2 exp (−6).

However, adapting the coefficient code words C entails the risk of deterioration in the event of a double-talk situation, which becomes evident from the fact that the near-end speech signal samples (pseudo-logarithmic code words S) have a level which may not be disregarded relative to the far-end speech signal samples (pseudo-logarithmic code words X). The solution adopted in the present echo canceller consists in considerably reducing the level of the correction terms ΔC for the entire duration of this situation. To this end, the multiplexer 59 has a second signal input 592 and a second control input 594. When this input 594 is validated, the input 592 transfers to the output 595 a positive or negative correction signal which is added by the adder 53 to the bit M8 of the mantissa. So the level of the correction signal thus produced is 24 dB lower than the level of the signal produced by validation of the control input 593.

The control input 594 is validated by means of the speech detector 90 which comprises a detection comparator 91 and a delayed-response circuit 92. The comparator 91 has two 7-bit inputs, one input of which is connected to the output connection 302 of the shift register 30 to receive the bits of the absolute value $|X|$ from the pseudo-logarithmic code words X and the other input is connected to the send path 20 to receive the bits of the absolute value $|R|$ from the pseudo-logarithmic code words R. This comparator 91 permanently compares each code word $|R|$ with the maximum absolute value word $|X(max)|$ of the sequence of the 32 most recent code words $|X|$. When it appears that the level corresponding to $|R|$ exceeds a quarter of the level corresponding to $|X(max)|$, that is to say when the ratio $|X(max)|/|R|$ is less than 12 dB, comparator 91 supplies a logic signal to the delayed-response circuit 92. If the duration of this logic signal is longer than 100 ms, the circuit 92 supplies a validation signal to the input 594 of the multiplexer 59 as long as this logic signal persists.

The presence of a pre-adjustment circuit for the coefficient code words C (unit 80, FIG. 6), however, is a reason to reconsider the use of the double-talk detector 90 (FIG. 8). In normal operation, the echo produced on establishment of the communication can be eliminated almost immediately. So it becomes possible to reduce the absolute value of the correction terms ΔC supplied by the multiplexer 59 for a finer adjustment of the value of the coefficient code words C. In the event of doubletalk, the stability of the echo canceller then becomes such that the said detector 90 is no longer useful. Reducing the value of these correction terms ΔC is effected by connecting the multiplexer 59 in such a manner to the adder 53 that the correction ΔC relates to the mantissa bit M7 of the code words C and no longer to the bit M5 (attenuation by 12 dB). The double-talk detector 90 is then omitted, as are also the inputs 592 and 594 of the multiplexer 59.

Tests performed by means of a bread board for feasibility studies made is possible to compare the performances of the two embodiments of the above-described echo canceller, namely:

a canceller A which incorporates a double-talk detector 90 and in which the correction ΔC relates to bit M5 of the code words C in the absence of double-talk and to bit M8 in the double-talk situation;

a canceller B which does not incorporate a double-talk detector 90 and in which the correction ΔC relates in all cases to bit M7 of the codewords C.

The total adaptation attenuation or echo return loss F is defined as the ratio P(X)/P(E) of the average power P(X) of the signals conveyed by the receive path (path VR in the FIGS. 1 and 2) and the average power P(E) of the echo occurring in the send path (VE in FIGS. 1 and 2).

In the case of canceller A, F exceeds 37 dB for each echo path normally occurring during operation and for the time P(X) remains larger than or equal to −27 dBmo. Below this limit F decreases linearly until the echo drowns in the noise generated by the codec.

In the case of canceller B, F exceeds 40 dB for the time P(X) remains larger than or equal to −20 dBmo. Below this limit F decreases in a quasi-linear manner.

The convergence rate of the coefficients C is perfectly satisfactory in both cases.

What is claimed is:

1. In an echo canceller for a telephone circuit having two digital paths for PCM signals obtained in accordance with a pseudo-logarithmic encoding law, which echo canceller is arranged in said telephone circuit in the proximity of a line interface unit for at least one subscriber and has for its object to cancel in one digital path for conveying pseudo-logarithmic code words S of a near-end speech signal supplied by said interface unit, denoted send path hereinafter, the echo effect of pseudo-logarithmic code words X of a far-end speech signal conveyed to said interface unit via the other digital path, denoted receive path hereinafter, the echo canceller comprising:

a first circulating shift register having an input, an output and a capacity of (k+1) code words, the input being connected to the receive path for receiving a pseudo-logarithmic code word X at each instant nT (where T is the sampling period of the code words and n is an integer for characterizing the number of the relevant instant) and the circulation rate of the code words in this first shift register being such that the sequence of the k most recent code words X occurs in the time interval between two consecutive instants nT and (n+1) T;

a second circulating shift register having an input, an output and a capacity of k code words, this second shift register operating in phase with the first shift register and a sequence of k coefficient code words C circulating permanently in this second shift register;

digital convolution calculation means having inputs connected to the output of the first shift register and the output of the second shift register, respectively, and an output supplying at each instant nT an echo cancellation code word obtained by summing k code words, each of which results from an operation for combining a code word C and a code word X supplied simultaneously by the first and second shift registers;

digital subtraction calculation means having an input connected to said interface unit, means for converting pseudo-logarithmic code words to linear code word, a correction input connected to the output of the convolution calculation means and an output connected to the send path, a sequence of pseudo-logarithmic code words R being supplied to the send path, each of which results from an operation for combining a code word S supplied by said interface unit and an echo cancellation code word supplied by the convolution calculation means;

digital correlation calculation means having inputs connected to the output of the first shift register, the subtraction calculation means and the output of the second shift register, respectively, and an output connected to the input of the second shift register for modifying the value of the code words C circulating therein as a function of comparison criteria for the code words supplied by the first shift register and the subtraction calculation means, respectively; the improvement wherein the convolution calculation means comprises:

a calculator unit having inputs connected to the output of the first shift register and the output of the second shift register, respectively, and an output, said calculator unit supplying a sequence of pseudo-logarithmic code words U, each of which results from an operation for combining a code word X and a code word C, a first pseudo-logarithmic-to-linear code converter having an input connected to the output of said calculator unit, and an output, this code converter converting each pseudo-logarithmic code word U into a linear code word u; and an accumulator-adder having an input connected to the output of said first code converter, and an output connected to the correction input of the subtraction calculation means, this accumulator-adder producing at each instant nT a linear echo cancellation code word $\bar{y}$ which is the sum of the k most recent linear code words u.

2. The invention as claimed in claim 1, wherein the means for converting pseudo-logarithmic code words to linear codes words comprises a second pseudo-logarithmic-to-linear code converter having an input connected to said interface unit for receiving the pseudo-logarithmic code words S, and an output, this code converter converting each pseudo-logarithmic code word S into a linear code word s; said subtraction calculation means further comprise:

a subtractor having a (+) input connected to the output of said second code converter, a (−) input connected to the output of said accumulator-adder, and an output, the subtractor supplying a sequence of linear code words r, each of which represents the difference between the value of a code word s and the value of an echo cancellation code word $\bar{y}$;

a linear-to-pseudo-logarithmic code converter having an input connected to the output of said subtractor, and an output connected to the send path, this code converter converting each linear code word r into a pseudo-logarithmic code word R; the improvement wherein the correlation calculation means comprise:

a third pseudo-logarithmic-to-linear code converter having an input connected to the output of the first shift register, and an output, this code converter converting each pseudo-logarithmic code word X into a linear code word x;

a comparison calculator unit having an input connected to the output of said third code converter, an input connected to the output of said subtractor, and an output, the comparison calculator unit comprising means for forming the average $|\bar{x}|$ of the absolute values $|x|$ of the k most recent code words x and for producing a correction validation signal when the absolute value $|\bar{x}|$ of a code word x differs from said average $|\bar{x}|$; and means connected to said comparison calculator unit and the second shift register for adding to the code words C circulating in the second shift register a correction term C having a predetermined absolute value and a suitable sign when said comparison calculator unit produces a correction validation signal.

3. An echo canceller as claimed in claim 2, wherein said comparison calculator unit comprises further means for preventing the release of the correction validation signal when said average $|\bar{x}|$ is not located between predetermined limits.

4. An echo canceller as claimed in claim 1 or claim 3, wherein said comparison calculator unit comprises further means for preventing the release of the correction validation signal when the ratio between the absolute value $|r|$ of a code word r and the value of said average $|\bar{x}|$ is not located between predetermined limits.

5. An echo canceller as claimed in one of the claims 2 or 3, wherein the echo canceller further comprises a double-talk detector connected to the send and receive paths for supplying a detection signal when the ratio between the absolute value of the code words R supplied to the send path and the absolute value of the code words X conveyed by the receive path exceeds a predetermined value, and the correlation calculation means comprise further means for reducing in response to said detection signal the value of the correction terms $\Delta C$ in a predetermined ratio.

6. An echo canceller as claimed in one of the claims 1-3, wherein the echo canceller further comprises means for injecting a pulse signal having a predetermined level into the receive path on the establishment of a communication involving said interface unit.

7. An echo canceller as claimed in claim 4, wherein the echo canceller further comprises means for injecting a pulse signal having a predetermined level into the receive path on the establishment of a communication involving said interface unit.

8. An echo canceller as claimed in claim 5, wherein the echo canceller further comprises means for injecting a pulse signal having a predetermined level into the receive path on the establishment of a cummunication involving said interface unit.

* * * * *

UNITED STATES PATENT AND TRADEMARK OFFICE
CERTIFICATE OF CORRECTION

PATENT NO. : 4,467,146

DATED : Aug. 21, 1984

INVENTOR(S) : JEAN LASSAUX

It is certified that error appears in the above-identified patent and that said Letters Patent is hereby corrected as shown below: Title page item [54]:

The correct title should read "ECHO CANCELLER FOR TELEPHONE TRANSMISSION OVER DIGITAL PATHS UTILIZING A PSEUDO-LOGARITHMIC ENCODING LAW".

Claim 2, Col. 19, line 3, "$|\tilde{x}|$" should be --$|x|$--.

Signed and Sealed this

Second Day of April 1985

[SEAL]

Attest:

DONALD J. QUIGG

Attesting Officer     Acting Commissioner of Patents and Trademarks